(12) United States Patent
Tanaka et al.

(10) Patent No.: US 7,705,066 B2
(45) Date of Patent: *Apr. 27, 2010

(54) WATER-BASED COATING COMPOSITION CURABLE WITH ACTINIC ENERGY RAY, COATED METALLIC MATERIAL, AND PROCESS FOR PRODUCING THE SAME

(75) Inventors: Shigehiro Tanaka, Kitaadachi-gun (JP); Masanori Takase, Hasuda (JP); Hiroshi Matsuo, Hatogaya (JP); Hiroshi Kanai, Futtsu (JP); Ikuro Yamaoka, Yokohama (JP); Yoichiro Mori, Nagoya (JP); Shin-ichi Ohara, Saitama (JP); Tadashi Fujii, Toda (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/483,259

(22) PCT Filed: Jul. 17, 2002

(86) PCT No.: PCT/JP02/07249

§ 371 (c)(1),
(2), (4) Date: Aug. 5, 2004

(87) PCT Pub. No.: WO03/008507

PCT Pub. Date: Jan. 30, 2003

(65) Prior Publication Data

US 2004/0249012 A1 Dec. 9, 2004

(30) Foreign Application Priority Data

Jul. 18, 2001 (JP) .............................. 2001-218649

(51) Int. Cl.
| B01F 3/04 | (2006.01) |
| B32B 27/00 | (2006.01) |
| B32B 27/40 | (2006.01) |
| B41J 2/16 | (2006.01) |
| B41M 1/30 | (2006.01) |
| B60C 1/00 | (2006.01) |
| C03C 25/10 | (2006.01) |
| C08F 2/46 | (2006.01) |
| C08G 18/08 | (2006.01) |
| C08G 18/67 | (2006.01) |
| C08J 3/28 | (2006.01) |
| C08K 3/20 | (2006.01) |
| C08K 3/34 | (2006.01) |
| C08K 9/00 | (2006.01) |
| C08L 75/00 | (2006.01) |

(52) U.S. Cl. ............................ 522/90; 522/91; 522/97; 522/98; 522/173; 522/181; 523/200; 523/216; 524/507; 524/591; 524/839; 524/840; 524/493; 524/492; 525/123; 525/455; 428/423.1; 428/425.1

(58) Field of Classification Search ................. 524/507, 524/591, 839, 492, 493, 840; 525/123, 455; 428/423.1, 425.1; 522/83, 84, 85, 90, 91, 522/97, 98, 173, 181; 523/200, 216
See application file for complete search history.

(56) References Cited

U.S. PATENT DOCUMENTS

| 3,867,351 A | 2/1975 | Juna et al. |
| 4,039,414 A | 8/1977 | McGinniss |
| 4,385,097 A * | 5/1983 | Isozaki et al. ............... 428/458 |
| 4,522,961 A | 6/1985 | Martino et al. |
| 5,300,558 A | 4/1994 | Kurisu et al. |
| 5,344,858 A | 9/1994 | Hart et al. |
| 5,348,991 A | 9/1994 | Yoshikawa et al. |
| 5,369,139 A | 11/1994 | Boeckeler et al. |
| 5,777,024 A | 7/1998 | Killilea et al. ............... 524/590 |
| 6,099,968 A | 8/2000 | Harakawa et al. |
| 6,207,744 B1 | 3/2001 | Paulus et al. |
| 6,265,461 B1 | 7/2001 | Urbano et al. |
| 2003/0130371 A1 | 7/2003 | Tanaka et al. ............... 522/162 |

FOREIGN PATENT DOCUMENTS

| DE | 692 18 018 C | 3/1997 |
| EP | 0 507633 A2 | 10/1992 |
| JP | 49-014626 A | 2/1974 |
| JP | 49-14626 | 4/1974 |
| JP | 2-41555 | 11/1983 |
| JP | 58-204060 | 11/1983 |
| JP | 61-76563 | 4/1986 |

(Continued)

OTHER PUBLICATIONS

European Search Report dated Jun. 16, 2005.

*Primary Examiner*—Patrick D Niland
(74) *Attorney, Agent, or Firm*—Edwards Angell Palmer & Dodge LLP

(57) ABSTRACT

The present invention provides an excellent radiation curable aqueous coating composition, which is highly safe and can make the adhesion to a metal surface and the corrosion resistance compatible which have been considered to conflict with each other, particularly adhesion after severe working and solvent resistance, and particularly durability to alcohols having high polarity. The composition of the present invention contains (1) a phosphoric acid ester compound having an ethylenically unsaturated double bond, (2) an aqueous polyurethane resin having both an ethylenically unsaturated double bond and a group capable of forming a salt, and (3) colloidal silica.

13 Claims, No Drawings

FOREIGN PATENT DOCUMENTS

| | | |
|---|---|---|
| JP | 63-225670 | 9/1988 |
| JP | 64-024817 | 1/1989 |
| JP | 02-041555 A | 2/1990 |
| JP | 2-178359 | 7/1990 |
| JP | 4-309568 | 11/1992 |
| JP | 8-259888 | 10/1996 |
| JP | 08-259888 | 10/1996 |
| JP | 10-251360 | 9/1998 |
| JP | 10-279832 | 10/1998 |
| JP | 10-298213 | 11/1998 |
| JP | 11-106468 | 4/1999 |
| JP | 11-209448 | 8/1999 |
| JP | 11-310757 | 11/1999 |
| JP | 2000-290536 | 10/2000 |
| JP | 2002-12797 | 1/2002 |
| KR | 10-271677 B | 11/1992 |
| WO | WO00/61691 | 10/1990 |
| WO | WO 01/83627 A1 | 11/2001 |

* cited by examiner

WATER-BASED COATING COMPOSITION CURABLE WITH ACTINIC ENERGY RAY, COATED METALLIC MATERIAL, AND PROCESS FOR PRODUCING THE SAME

TECHNICAL FIELD

The present invention relates to: a radiation curable aqueous coating composition having excellent solvent resistance and excellent adhesion to the surface of a metal material; a coated metal material with a cured coating film of the coating composition, which has excellent adhesion to the surface of a metal material and excellent adhesion to the surface of a metal material after severe working, and excellent solvent resistance; and a manufacturing method therefor.

BACKGROUND ART

To modify the surface of metal materials, for example, a plated steel sheet, a steel sheet is treated with various coating compositions and surface treating chemicals.

The object of the treatment is to improve the prevention of leaving fingerprints, workability, chemical solution resistance, and corrosion resistance, and these properties are improved by mainly applying an organic resin on the surface of a steel sheet.

For the case in which the metal material is worked after being subjected to a surface treatment, a soft organic resin having good workability is often used to impart appropriate workability. When using such a soft organic resin, it frequently becomes difficult to impart properties such as surface hardness, solvent resistance, and wear resistance.

Also, treatments for forming an inorganic coating film, for example, a chromate treatment and zinc phosphating treatment, are commonly conducted. These treatments impart good corrosion resistance and solvent resistance, but the workability is inferior as compared with the case of using an organic resin.

For the case in which the metal material is coated with an organic coating film, the organic coating film layer is often formed after forming an undercoat layer by a chromate treatment so as to enhance the adhesion between the metal surface and the organic coating film layer. However, it is reported that hexad chrome contained in a chromating agent and a coating film is toxic to organisms and is an environmental burden, and thus a treating method is required using a treating agent having low toxicity and a small environmental burden, which replaces the chromate treatment.

However, it is difficult to develop a treating agent, which has low toxicity and a small environmental burden and which can ensure an adhesion equivalent to that for the case of the chromate treatment. A chemical for a coating treatment of the metal surface which is capable of imparting sufficient adhesion could not be obtained. Therefore, a treating chemical and a coating layer, which exhibit good adhesion, are highly safe, and are highly sanitary with or without chromate treatment, are now required.

In the field of the working of metal materials, particularly metal sheets such as aluminum, copper, and iron sheets, or plated steel sheets, the metal sheets have hitherto been worked after applying a lubricating oil to the surface thereof, and are then degreased.

The steps of applying a lubricating oil only for working, followed by working and further degreasing are complicated, so that it is strongly desired to simplify the step of applying a lubricating oil and the step of degreasing. Therefore, development of a coating composition for forming an organic coating film has been strongly desired which has a surface lubricating function and a rust preventing function or a function capable of wet-on-wet coating of another coating composition, and also has high adhesion even without being subjected to a chromate treatment.

To obtain a viscosity of the coating composition which is suitable for coating, such as coating and printing, a solvent type coating composition to be diluted with a solvent has heretofore been widely used in conventional coating compositions, coating agents, and inks. The use of an organic solvent has problems in aspects of safety and health as well as the working environment.

For the case of a solvent-free type coating composition, although a drying step is not required, heating of the coating composition is sometimes required to obtain a viscosity of the coating composition which is suitable for coating because the coating viscosity is too high at normal temperatures. Furthermore, when the viscosity is lowered by adding a monomer, a problem remains in that a diluting monomer to be added is toxic to the skin and has an odor, which is similar to the problem of the solvent type coating composition.

Moreover, when using a high-molecular weight binder resin to improve the physical properties of the coating film, the viscosity of the coating composition becomes too high, thereby making it impossible to use such a high-molecular weight binder resin. Therefore, it is difficult to obtain excellent physical properties of the coating film.

To solve these problems, intensive studies and developments about an aqueous coating composition, in which the viscosity of the coating composition can be easily adjusted using water which is safe and nontoxic, have recently been made.

Dispersion or dissolution of a resin in an aqueous medium is attained by using a dispersant or an emulsifier, or a resin which has a polar group on a main or side chain and also has solubility or self-dispersibility in water.

The latter self-dispersible or water-soluble resin has guaranteed comparatively excellent properties. However, when using a resin having a polar group in a molecule as a binder resin of the coating composition, the resulting coating film tends to be inferior in water resistance and solvent resistance.

As a means which can completely solve these problems, for example, problems about safety and the environment, while maintaining the required physical properties of the coating film, aqueous radiation curable coating compositions, coating agents and inks have been proposed.

Japanese Unexamined Patent Application, First Publication No. Hei 8-259888 proposes an aqueous dispersion comprising water and radiation curable microgel particles dispersed in water.

The microgel particles are gel-like film-forming polyurethane resin particles having a crosslinked structure obtained by crosslinking polyurethane resins through a urethane bond or a urea bond, and the polyurethane resin has a radiation curable ethylenically unsaturated double bond and a salt group.

The above publication describes that the coating film-forming polyurethane resin particles can contain 1 to 50% of another radiation curable compound and an initiator for the radiation curing reaction therein, and that an aqueous coating film having excellent water resistance and excellent solvent resistance can be obtained by using these radiation curable microgel particles regardless of the aqueous coating composition.

Japanese Unexamined Patent Application, First Publication No. Hei 9-31150 discloses, as a composition capable of forming a highly crosslinked coating film, a radiation curable aqueous polyurethane resin composition prepared by reacting a product, which is obtained by the Michael addition of a hydroxyl compound having an active hydrogen to a double bond of a compound having two or more (meth)acryloyl groups, a polyhydroxy compound having an acidic group, and a polyisocyanate as an indispensable component.

Generally, a composition having an acryloyl group, which is superior in curability, has conventionally been used as a radiation curable composition, and Japanese Unexamined Patent Application, First Publication No. Hei 10-251360 discloses that a radiation curable aqueous polyurethane composition having a methacryloyl group is superior in adhesion, chemical resistance, surface hardness, and yellowing resistance, and is used in coating compositions, coating agents, and inks.

Japanese Unexamined Patent Application, First Publication No. Hei 10-251361 describes that excellent adhesion, excellent solvent resistance, excellent workability, and excellent coatability can be obtained by mixing radiation curable microgel particles with a radiation curable aqueous polyurethane resin.

These radiation curable aqueous polyurethane resin compositions are used in coating compositions, coating agents, and inks because of their excellent adhesion to any of organic materials (e.g., plastic films, wood construction materials and decorative papers for construction materials) and inorganic materials (e.g., metal materials and glass) and because of their excellent solvent resistance.

Any of these compositions is a radiation curable aqueous composition containing an aqueous polyurethane resin having both a radiation curable ethylenically unsaturated double bond and a salt group. A coating film thereof is cured by radiation, and the solvent resistance is enhanced as the acryloyl group concentration and crosslinking degree increase.

However, the adhesion and the workability tend to be deteriorated as the crosslinking degree increases. A salt group and a polar group must be introduced to obtain an aqueous resin composition. Therefore, even if the crosslinking degree of the composition is increased, it becomes difficult to obtain sufficient solvent resistance to a polar solvent.

If the crosslinking degree of the binder resin is drastically increased to obtain the desired solvent resistance, the coating film becomes brittle. Therefore, a metal sheet having such a cured coating film cannot be used for purposes that require high workability which can endure drawing, and that require adhesion.

Japanese Unexamined Patent Application, First Publication No. Hei 10-298213 discloses, as a composition having excellent stability of an emulsion and good adhesion to a base material, a radiation curable emulsion containing a radiation curable emulsifier which has a polymerizable double bond and also has an anionic hydrophilic group such as a carboxyl group, phosphoric acid ester group, carboxylic acid salt group, phosphoric acid ester salt group, or the like.

However, it is difficult for the resulting emulsion type composition to be homogenized during the formation of a coating film thus resulting in poor physical properties, such as surface smoothness and gloss of the coating film, as well as poor solvent resistance and poor chemical resistance.

Since the emulsion composition exhibits non-Newtonian flow, the resulting coating composition is inferior in coatability during roll coating as compared to a homogeneous water-soluble type coating composition.

Such a drawback that the emulsion composition is not homogenized during the formation of the coating film arises particularly in a thin cured coating film having a thickness of several microns, thus resulting in poor solvent resistance of the coating film, poor adhesion to a base material, and poor workability.

Japanese Unexamined Patent Application, First Publication No. Sho 61-83262, Japanese Examined Patent Application, Second Publication No. Hei 2-41555 and Japanese Unexamined Patent Application, First Publication No. Hei 5-320568 disclose a thermosetting composition, the adhesion of which is improved by adding a reaction product of an epoxy resin and phosphoric acid, or an epoxy resin, phosphoric acid ester, and carboxylic acid to an aqueous acrylic resin and an aqueous amino resin.

Although these compositions have excellent adhesion, the thin coating film having a thickness of several microns made from these compositions is inferior in solvent resistance, adhesion, and workability.

As described above, although various attempts have been made, a coating film formed on the metal sheet has not been known which has excellent adhesion to the surface of the metal sheet and maintains coating film adhesion while enduring severe working such as deep drawing, and which has excellent corrosion resistance and exhibits very high durability to a polar solvent and an alkali chemical solution.

DISCLOSURE OF INVENTION

An object of the present invention is to provide an excellent radiation curable aqueous coating composition, which is highly safe and which can make the adhesion to a metal surface and the corrosion resistance compatible which have been considered to conflict with each other, particularly adhesion after severe working and solvent resistance, and particularly durability to alcohols having high polarity. Another object of the present invention is to provide a coated metal material with a cured coating film having excellent adhesion to the surface of the metal material and excellent solvent resistance, which is obtained by forming a coating film of the coating composition on the surface of a metal material and curing the coating film with radiation, and to provide a manufacturing method therefor.

The present inventors have intensively studied and found that a radiation curable aqueous coating composition containing a specific phosphoric acid ester compound, a specific aqueous polyurethane resin, and colloidal silica can achieve the object described above, thus completing the present invention.

The gist of the first invention in the present invention lies in a radiation curable aqueous coating composition comprising:

(1) a phosphoric acid ester compound having an ethylenically unsaturated double bond (hereinafter referred to as a phosphoric acid ester compound (1)), (2) an aqueous polyurethane resin having both an ethylenically unsaturated double bond and a group capable of forming a salt (hereinafter referred to as an aqueous polyurethane resin (II)), and (3) colloidal silica.

The gist of the second invention in the present invention lies in a coated metal material comprising a metal material and a coating film formed on the surface of the metal material, the coating film being formed by curing the radiation curable aqueous coating composition described above with radiation.

The gist of the third invention in the present invention lies in a method for manufacturing a coated metal material, comprising the steps of applying the radiation curable aqueous coating composition described above on the surface of a metal material, vaporizing a solvent component in the coating composition to form a coating film, and irradiating the coating film with radiation.

According to the inventions described above, it is possible to provide (1) a radiation curable aqueous coating composition having excellent solvent resistance and excellent adhesion to the surface of the metal material, (2) a coated metal material with a cured coating film having excellent solvent resistance, excellent corrosion resistance and excellent adhesion to the surface of the metal material, and (3) a method for manufacturing the coated metal material.

BEST MODE FOR CARRYING OUT THE INVENTION

Radiation Curable Aqueous Coating Composition

The radiation curable aqueous coating composition of the present invention contains a phosphoric acid ester compound (I), an aqueous polyurethane resin (II) and colloidal silica.

A solvent or a dispersion medium of this aqueous coating composition is basically composed of water, but may contain an organic solvent as long as it can dissolve or disperse the phosphoric acid ester compound (I), the aqueous polyurethane resin (II) and colloidal silica therein, in addition to water.

The content of the organic solvent in the radiation curable aqueous coating composition is preferably 5% by weight or less in aspects of safety and health as well as less environmental pollution.

As used herein, the radiation refers to energy line such as ultraviolet light, visible light, electron beam, X-ray or the like.

(1) Phosphoric Acid Ester Compound (I)

The phosphoric acid ester compound (I) used in the radiation curable aqueous coating composition of the present invention is a compound having one or more ethylenically unsaturated double bonds in a molecule, and examples thereof include phosphoric acid alkyl ester, phosphoric acid allyl ester and phosphoric acid aralkyl ester, each having an ethylenically unsaturated double bond in the same molecule.

More specific examples are reaction product of phosphoric acid (meth)acrylate represented by the following General Formula (1), i.e. phosphoric acid monoester or phosphoric acid diester, and alkyl monoglycidyl ethers, alkyl glycidyl ester or a polyepoxy compound, reaction product of a compound having both an epoxy group and an ethylenically unsaturated double bond (e.g., glycidyl methacrylate) and phosphoric acid, phosphoric acid monoester or phosphoric acid diester, and phosphoric acid polyether (meth)acrylate represented by the following General Formula (2). Phosphoric acid (meth)acrylates represented by the General Formula (1) are particularly preferred.

General Formula (1)

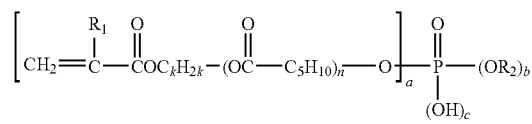

(wherein $R_1$ represents a hydrogen atom or a methyl group, $R_2$ represents alkyl group having 1 to 8 carbon atoms, k represents an integer of 2 to 12, n represents an integer of 0 to 3, a+b+c=3, a represents an integer of 1 to 3, and b represents an integer of 0 to 2)

General Formula 2

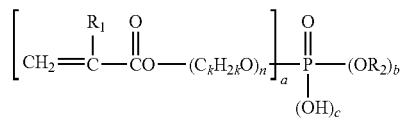

(wherein $R_1$ represents a hydrogen atom or a methyl group, $R_2$ represents alkyl group having 1 to 8 carbon atoms, k represents an integer of 2 to 4, n represents an integer of 1 to 10, a+b+c=3, a represents an integer of 1 to 3, and b represents an integer of 0 to 2)

Examples of the phosphoric acid esters having a (meth)acryloyloxy group represented by the General Formula (1) include compound obtained by dehydration condensation of phosphoric acid, 2-hydroxyethyl acrylate and 2-hydroxyethyl methacrylate, and dehydrated condensate of a compound obtained by ring-opening addition of ε-caprolactone to 2-hydroxyethyl acrylate or 2-hydroxyethyl methacrylate and phosphoric acid.

Examples of the phosphoric acid esters having a (meth)acryloyloxy group represented by the General Formula (2) include compound obtained by dehydration condensation of an adduct such as ethylene oxide, propylene oxide or tetrahydrofuran to acrylic acid, methacrylic acid, 2-hydroxyethyl acrylate or 2-hydroxyethyl methacrylate and phosphoric acid.

The phosphoric acid ester compound (I) can be dissolved or dispersed uniformly in water by neutralizing with a basic compound.

The phosphoric acid ester compound (I) in the aqueous coating composition of the present invention improves the adhesion of the coating film to the metal surface, while excess addition thereof deteriorates the stability of the coating solution as well as the corrosion resistance and the alkali resistance, of the coating film. Taking account of these actions; preferred amount is within a range from 1 to 30% by weight (0.2 to 5% by weight reduced to a phosphorus atom basis) based on the nonvolatile content of the composition, and more preferred amount is within a range from 5 to 15% by weight (1 to 2.5% by weight reduced to a phosphorus atom basis).

(2) Aqueous Polyurethane Resin (II)

The aqueous polyurethane resin (II) used in the radiation curable aqueous coating composition of the present invention is a polyurethane resin having both an ethylenically unsaturated double bond and a group capable of forming a salt.

Such an aqueous polyurethane resin can be obtained in the following manner. For example, a reaction product of a compound (a) having a group capable of forming a salt using a solvent, which does not react with an isocyanate group, as a reaction solvent, a di- or polyfunctional polyisocyanate compound (b) and a polyol compound (c) is reacted with a compound (d) having an ethylenically unsaturated double bond to obtain a polyurethane resin. Then, a group capable of forming a salt in this polyurethane resin is neutralized and water is added, thereby making it possible to obtain an aqueous polyurethane resin. If necessary, the reaction solvent may be removed by distillation under reduced pressure.

(2-1) Compound (a) Having a Group Capable of Forming a Salt

As used herein, the term "a group capable of forming a salt" refers to an acidic group capable of forming a salt with a base, or a basic group capable of forming a salt with an acid. The former includes carboxyl group, sulfonic acid group and phosphoric acid ester group, while the latter includes amino group, N-substituted amino group and N,N-di-substituted amino group.

The term "a compound (a) having a group capable of forming a salt" used in the present invention refers to a compound which has any group capable of forming a salt and also has two or more functional groups having reactivity with the isocyanate group. Examples thereof include diols and diamines.

Specific examples thereof include trimethylolpropanemonophosphoric acid ester; trimethylolpropanemonosulfuric acid ester; polyester diol wherein at least a portion of a dibasic acid component is sodium sulfosucciniate or sodium sulfoisophthalate; N-methyldiethanolamine; diaminocarboxylic acids such as lisine and cystine; dihydroxyalkylalcanoic acids such as 2,6-dihydroxybenzoic acid and 3,5-dihydroxybenzoic acid, 2,2-bis(hydroxymethyl)propionic acid, 2,2-bis(hydroxyethyl)propionic acid, 2,2-bis(hydroxypropyl)propionic acid, bis(hydroxymethyl)acetic acid and 2,2-bis(hydroxymethyl)butanoic acid); bis(4-hydroxyphenyl)acetic acid; 2,2-bis(4-hydroxyphenyl)pentanoic acid; tartaric acid; N,N-dihydroxyethyl glycine; N,N-bis(2-hydroxyethyl)-3-carboxy-propionamide; and carboxyl group-containing polycaprolactonediol wherein a lactone compound such as ε-caprolactone is added to dihydroxyalkylalkanoic acid.

The requisite amount of the group capable of forming a salt can be appropriately decided according to the kind and composition ratio of the components. Among the examples described above, compounds having any one or two groups selected from a carboxyl group and a sulfonic acid salt group, or a mixture thereof. It is particularly preferred to introduce a carboxyl group because good balance can be easily attained in various aspects.

The acid value of the aqueous polyurethane resin (II) is preferably within a range from 20 to 100 KOH mg/g, and more preferably from 25 to 40 KOH mg/g.

(2-2) Polyisocyanate Compound (b)

Examples of the polyisocyanate compound (b) include aliphatic polyisocyanates, for example, aliphatic diisocyanates such as 1,6-hexamethylene diisocyanate, 2,2,4-trimethylhexamethylene diisocyanate, and lysine diisocyanate, trimer of the aliphatic isocyanate, and adduct of a low-molecular triol and the aliphatic isocyanate; alicyclic polyisocyanates, for example, alicyclic diisocyanates such as isophorone diisocyanate, dicyclohexylmethane-4,4'-diisocyanate, hydrogenated tolylene diisocyanate, methylcyclohexylene diisocyanate, isopropylidene cyclohexyl-4,4'-diisocyanate, and norbornene diisocyanate, trimer of the alicyclic diisocyanate, and adduct of a low-molecular triol and the alicyclic diisocyanate; aromatic-aliphatic polyisocyanates, for example, aromatic-aliphatic diisocyanates such as xylylene diisocyanate, trimer of xylylene diisocyanate, and adduct of a low-molecular triol and the aromatic-aliphatic diisocyanate; tri- or polyfunctional polyisocyanates, for example, aromatic diisocyanates such as diphenylmethane-4, 4'-diisocyanate and tolylene diisocyanate, aromatic polyisocyanates such as triphenylmethane triisocyanate, trimer of the aromatic diisocyanate, and adduct of a low-molecular triol and the aromatic diisocyanate, and polymethylenepolyphenyl isocyanate; and polyisocyanates compounds having a carbodiimide group, such as COSMONATE LL (mixture of carbodiimidated 4,4'-diphenylmethane diisocyanate and 4,4'-diphenylmethane diisocyanate manufactured by Mitsui Chemicals) and Carbodilite V-05 (terminated aliphatic polyisocyanate compound having a polycarbodiimide group, manufactured by Nisshinbo Industries Inc.). Two or more polyisocyanate compounds can be used in combination.

(2-3) Polyol Compound (c)

As the polyol compound (c), glycols and polymeric polyols can be used.

Examples of the glycols include ethylene glycol, propylene glycol, diethylene glycol, cyclohexane-1,4-dimethanol, 1,3-butylene glycol, 1,4-butylene glycol, neopentyl glycol, 1,6-hexanediol, 3-methyl-1,5-pentanediol, 2-ethyl-1,3-hexanediol, 2-butyl-2-ethyl-1,3-propanediol, methyl-1,8-octanediol, 1,9-nonanediol, cyclohexyl dimethanol, bisphenol A, bisphenol F, hydrogenated bisphenol A, hydrogenated bisphenol F, and castor oil-modified diol.

The glycols further include glycerin, triol such as trimethylolpropane, tetraol such as pentaerythritol, and castor oil-modified polyol.

Examples of the polymeric polyol include polyester polyol, polycarbonate polyol and polyether polyol. The molecular weight of the polyol is preferably within a range from 500 to 5,000 in terms of a number-average molecular weight.

Examples of the polyester polyol include polyester polyols obtained by the addition reaction and/or the condensation reaction of one or more monoepoxy compounds selected from alkyl monoglycidyl ethers such as ethyl glycidyl ether, methyl glycidyl ether, butyl glycidyl ether, 2-ethylhexyl glycidyl ether, lauryl glycidyl ether, decyl glycidyl ether and stearyl glycidyl ether or alkyl glycidyl ester (manufactured by Shell, Japan under the trade name of Cardula E10) and one or more polybasic acids or acid anhydrides selected from aliphatic dibasic acids such as adipic acid, azelaic acid, sebacic acid and dimer acid, or aromatic polybasic acids, or anhydrides thereof such as isophthalic acid, terephthalic acid and trimellitic anhydride, or alicyclic polybasic acids or anhydrides thereof such as hydrophthalic anhydride and dimethyl-1,4-cyclohexanedicarboxylic acid, in addition to the polyols described above.

Furthermore, polyester polyols obtained by the ring-opening polymerization of ε-caprolactone and β-methyl-δ-varelolactone.

Examples of the polycarbonate polyol include hexamethylene polycarbonate polyol obtained from 1,6-hexanediol as a raw material, polycarbonate diol made of 1,4-butylene glycol, polycarbonate diol made of neopentyl glycol, polycarbonate diol made of 3-methyl-1,5-pentanediol, and polycarbonate diol made of 1,9-nonanediol.

Specific examples of the polyether polyol include polyalkylene glycols such as polyethylene glycol, polypropylene glycol and polytetramethylene glycol. Among these, polytetramethylene glycol is particularly useful to improve the solvent resistance and the degreasing solution resistance while maintaining the workability of the coating film.

(2-4) Compound (d) Having an Ethylenically Unsaturated Double Bond is a Compound Which has a Functional Group Having Reactivity with Isocyanate (e.g., Hydroxyl Group, Amino Group, etc.) and an Ethylenically Unsaturated Double Bond.

Specific examples of such a compound include monohydroxy mono(meth)acrylates such as 2-hydroxyethyl (meth)acrylate, 2-hydroxypropyl (meth)acrylate and hydroxybutyl (meth)acrylate; monohydroxy di(meth)acrylates such as glycerin di(meth)acrylate and LIGHT-ESTER G-201P (manufactured by KYOEISHA CHEMICAL CO., LTD.); monohydroxy triacrylates such as pentaerythritol triacrylate; monohydroxy pentaacrylates such as dipentaerythritol pentaacrylate; dihydroxy mono(meth)acrylates such as glycerin mono(meth)acrylate; and compounds obtained by the addition polymerization of these compounds with ethylene oxide, propylene oxide, tetrahydrofuran or ε-caprolactone.

The compound further includes products obtained by the Michael addition reaction of polyfunctional acrylates such as trimethylolpropane triacrylate, pentaerythritol tetraacrylate and dipentaerythritol hexaacrylate and dialkanolamines such as diethanolamine, diisopropanolamine, dipropanolamine and dibutanolamine or monoalkylalkanolamines such as methylethanolamine, ethylethanolamine and methylpropanolamine.

The compound further includes half urethanes obtained by reacting diisocyanates containing two isocyanate groups having different reactivities, such as isophorone diisocyanate and tolylene diisocyanate with monohydroxy mono(meth)acrylate and monohydroxy di(meth)acrylate; and products obtained by reacting methacryl isocyanate with dialkanolamines or monoalkylmonoalkanolamines.

(2-5) Synthesis of Aqueous Polyurethane Resin (II)

Typical method of preparing an aqueous polyurethane resin (II) will be described below. First, a compound (a) having a group capable of forming a salt, a di- or polyfunctional polyisocyanate compound (b) and a polyol compound (c) are mixed so that excess isocyanate groups exist, thus obtaining an isocyanate group-terminated polyurethane prepolymer.

The reaction between the hydroxyl group and the isocyanate group can be conducted at a temperature within a range from 20 to 120° C. with or without using a solvent which does not react with the isocyanate group.

At this time, a proper amount of publicly known polymerization inhibitors and urethanization catalysts can be added, if necessary.

Examples of the polymerization inhibitor include hydroquinone, tertiary butyl hydroquinone, and methoquinone.

As the urethanization catalyst, for example, dibutyltin dilaurate, stannous octoate, triethylamine, N,N-dimethylbenzylamine, sodium hydroxide, and diethylzinctetra(n-butoxy) titanium can be used.

It is preferred to react in an organic solvent which is inert to the isocyanate group, and examples thereof include acetone, methyl ethyl ketone, ethyl acetate, dioxane, acetonitrile, tetrahydrofuran, benzene, toluene, xylene, monoglyme, diglyme, dimethyl sulfoxide and N-methylpyrrolidone. These reaction solvents can be used alone or in combination.

Then, this isocyanate group-terminated polyurethane prepolymer is reacted with the compound (d) having an ethylenically unsaturated double bond, thus making it possible to obtain a polyurethane prepolymer which has an ethylenically unsaturated double bond and/or an isocyanate group at a molecular chain terminal and also has a group capable of forming a salt.

In the reaction of introducing a group having an ethylenically unsaturated double bond, or in another reaction after introducing the group having an ethylenically unsaturated double bond, polymerization inhibitors such as hydroquinone, tertiary butyl hydroquinone and methoquinone are preferably used.

Then, the group capable of forming a salt in the polyurethane prepolymer is neutralized and the prepolymer is dispersed in water to prepare a water-organic solvent mixed solution.

Examples of the basic compound capable of neutralizing the carboxyl group listed as an example of the group capable of forming a salt, the phosphoric acid ester compound (I) and the phosphoric acid esters having a (meth)acryloyloxy group represented by the General Formula (1) include trialkylamines such as trimethylamine and triethylamine; alkylalkanolamines such as dimethylmonoethanolamine, diethylethanolamine and diethanolmonomethylamine; and basic vinyl monomers such as dimethylaminoethyl methacrylate and diethylaminoethyl methacrylate.

Then, a crosslinking agent dissolved in water or an organic solvent is added, if necessary.

Examples of the crosslinking agent include aliphatic amine such as ethylenediamine, piperazine, N-aminoethylpiperazine, hexamethylenediamine, hydrazine, diethyltriamine, triethylteramine or tetraethylenepentamine; alicyclic amine such as cyclohexylenediamine, isophoronediamine or norbornanediaminoethyl; aromatic amine such as tolylenediamine, xylenediamine, phenylenediamine, tris(2-aminoethyl)amine or 2,6-diaminopyridine; and aminosilane such as γ-aminopropyltrimethoxysilane, γ-diaminopropyltriethoxysilane, N-β-(aminoethyl)-γ-aminopropyltrimethoxysilane or N-β-(aminoethyl)-γ-aminopropylmethyldimethoxysilane.

Examples of the ketimine compound include ketimine compounds produced by dehydration of primary amine such as diamine or triamine and isobutyl ketone.

According to another method for crosslinking or chain extension of the aqueous polyurethane resin (II) using the crosslinking agent, the crosslinking agent is previously dissolved in an aqueous phase and an organic solution prepared by dissolving an urethane prepolymer in an organic solvent is dispersed in the aqueous phase to prepare a water-organic solvent mixed solution.

Then, the organic solvent is distilled off from this water-organic solvent mixed solution under reduced pressure, thus making it possible to obtain an aqueous solution or a water dispersion of a radiation curable aqueous polyurethane resin (II).

By using dicyclohexylmethane-4,4'-diisocyanate (hereinafter referred to as hydrogenated MDI) as a portion or all of the di- or polyfunctional polyisocyanate compound, an aqueous polyurethane resin (II) using hydrogenated MDI is obtained and the aqueous polyurethane resin (II) using hydrogenated MDI is preferably used because of its excellent solvent resistance. A ratio of the hydrogenated MDI to the whole polyisocyante is preferably 25% by weight or more. Furthermore, the concentration of an ethylenically unsaturated group of the aqueous polyurethane resin (II) is preferably within a range from 1 to 5 eq./kg.

(3) Colloidal Silica

Colloidal silica as a third essential component used in the radiation curable aqueous coating composition of the present invention is obtained by dispersing negatively charged amorphous silica particles in water in the form of colloid. Amines may be added to obtain a stably dispersed state of colloidal silica.

In the present invention, any colloidal silica can be used, but more preferred is colloidal silica, which is surface-treated with aluminum, because of its improved dispersibility. Examples of colloidal silica, which is surface-treated with aluminum, include "Snowtex C" (manufactured by Nissan Chemical Industries Ltd.).

The amount of colloidal silica is preferably within a range from 3 to 60% by weight based on the nonvolatile content of the radiation curable aqueous coating composition in view of an improvement in solvent resistance, while the amount is more preferably within a range from 5 to 25% by weight in the case in which the degreasing solution resistance is thought as important.

(4) Preparation of Radiation Curable Aqueous Coating Composition

The radiation curable aqueous coating composition of the present invention can be obtained by dissolving or dispersing a phosphoric acid ester compound (I), an aqueous polyurethane resin (II) and colloidal silica in an aqueous solvent.

The aqueous solvent is basically composed of water, but may contain an organic solvent as long as it can dissolve or disperse the phosphoric acid ester compound (I), the aqueous polyurethane resin (II) and colloidal silica therein, in addition to water, and the organic solvent can be arbitrarily selected within the above range of conditions. The content of the organic solvent in the radiation curable aqueous coating composition is preferably 5% by weight or less in aspects of safety and health as well as less environmental pollution.

In the synthesis of the aqueous polyurethane resin (II), dicyclohexylmethane-4,4'-diisocyanate is preferably used as the polyisocyanate compound (b) because a cured coating film having particularly excellent solvent resistance can be obtained.

If necessary, additives and auxiliaries such as radiation polymerizable monomers, radiation polymerizable oligomers, publicly known radiation curing polymerization initiators, publicly known resin compositions, amino-plasts, silane coupling agents, diluents, surfactants, plasticizers, waxes, hydrolysis inhibitors, emulsifiers, leveling agents, defoamers, antioxidants, and antibacterial agents can be incorporated. Furthermore, inorganic powders such as silica powders and alumina; colorants such as publicly known dyes and pigments; rust-preventive pigments and rust preventives may be incorporated, if necessary.

These additives can be added in the case of preparing the coating composition. As disclosed in Japanese Unexamined Patent Application, First Publication No. Hei 8-259888, when the additive is introduced before phase inversion into water in the preparation of the aqueous polyurethane resin (II) used in the present invention, the additive can be easily mixed even if it is a water-insoluble compound.

When using a silane coupling agent as the additive, high boiling resistance can be obtained. The addition thereof can improve the storage stability of the coating composition.

The silane coupling agent preferably has a functional group having affinity or reactivity with an organic material, and an alkoxysilane group having affinity or reactivity with an inorganic material in a molecule.

Specific examples thereof include vinylsilane such as vinyltrimethoxysilane, vinyltriethoxysilane, or vinyltris($\beta$-methoxyethoxy)silane; (meth)acryloyloxysilane such as $\gamma$-(methacryloyloxypropyl)trimethoxysilane or $\gamma$-(methacryloyloxypropyl)methyldimethoxysilane; epoxysilane such as $\beta$-(3,4-epoxycyclohexyl)ethyltrimethoxysilane, $\gamma$-glycidoxypropyltrimethoxysilane, or $\gamma$-glycidoxypropyltriethoxysilane; aminosilane such as $\gamma$-anilinopropyltrimethoxysilane or $\gamma$-aminopropyltriethoxysilane; $\gamma$-mercaptopropyltrimethoxysilane; and alkylsilane such as isobutyltrimethoxysilane, n-decyltrimethoxysilane, or n-octadecyltrimethoxysilane.

As the silane coupling agent to be added to the present invention, $\gamma$-(methacryloyloxypropyl)trimethoxysilane can be used particularly preferably because of its excellent boiling resistance.

One or more kinds of silane coupling agents can be mixed previously or added separately. For example, aminosilane and epoxysilane can be added after previously mixing. The amount can be selected arbitrarily, but is preferably within a range from about 0.1 to 20% by weight based on the nonvolatile content of the aqueous coating composition in order to improve the boiling resistance and the storage stability.

(Coated Metal Material)

The coated metal material of the present invention, comprising a metal material and a coating film formed on the surface of the metal material, the coating film being formed by curing the radiation curable aqueous coating composition with radiation, will now be described.

That is, regarding the cured coating film on the coated metal material of the present invention, the phosphoric acid ester group bonded chemically to the aqueous resin has the affinity or chemical bonding to the surface of the metal material and also crosslinked by the polymerization of an ethylenically unsaturated double bond due to irradiation with radiation. To sum up, the formed coating film is not only cured by the polymerization of the ethylenically unsaturated double bond due to irradiation with radiation, but also firmly adhered due to the affinity or chemical bonding of the phosphoric acid ester group to the surface of the metal material.

The coated metal material of the present invention is used in various purposes, and the cured coating film is formed on the surface for the purpose of surface protection in view of uses in prevention for adhesion of fingerprint, lubricating steel plate, primer, and coating film requiring no top coat.

The thickness of the cured coating film is not specifically limited and may be decided according to the purposes. In the case of imparting the fingerprint resistance and the lubricity, the thickness of the cured coating film is preferably within a range from about 1 to 3 $\mu$m. In the case of requiring to secure the conductivity such as grounding, smaller thickness ranging from about 0.5 to 1 $\mu$m is preferred.

Examples of the metal material include non-ferrous metal materials such as titanium, copper, aluminum, and zinc, in addition to steel materials. These metal materials may be material whose surface is coated with a coating agent of metal, a metal compound, non-metal or a mixture thereof.

As the coating agent, a metal coating agent can be used such as zinc, nickel, copper, chromium, tin, lead, aluminum, iron, or an alloy thereof; a metal-based coating agent prepared by dispersing silica, alumina, polyethylene glycol or amine in the metal coating agent; a metal compound coating agent such as zinc phosphate, magnesium phosphate, or alumina; and a non-metal coating agent such as ceramics, graphite, resin or a mixture thereof. A coating layer can be formed on the surface of the metal material by a thermal spraying or plating method using these coating agents.

In the case of a metal material coated with a coating agent containing zinc, namely, a metal material coated with zinc, an alloy of zinc and another metal, or a zinc compound such as zinc phosphate among metal materials coated with these coating agents, when a coating film is formed by applying the radiation curable aqueous coating composition of the present invention to this metal material and then cured, it is possible to obtain a coated metal material which has high surface hardness of the coating film, excellent solvent resistance, excellent adhesion to the metal material, excellent corrosion resistance and excellent workability.

The metal material may be a metal material having, on the surface, an inorganic coating film formed by pre-coating treatment such a chromate treatment, like the prior art. As the material in the coated metal material of the present invention, a metal material with no inorganic coating film can be used.

In the case of a metal material containing zinc on the metal surface, it is believed that a phosphoric acid compound is likely to react with zinc. The use of such a metal material exerts the effect equal to or higher than that in the case of being subjected to a chromate treatment in the effect of the adhesion to the metal material and the solvent resistance of the coating film, that is an object of the present invention, thus making it possible to avoid problems such as toxicity and environmental burden of hexad chrome.

(Method for Manufacturing Coated Metal Material)

The method for manufacturing a coated metal material of the present invention, comprising the steps of applying the radiation curable aqueous coating composition on the surface of a metal material, vaporizing a solvent component in the coating composition to form a coating film, and irradiating the coating film with radiation, will now be described.

The method for manufacturing a coated metal material usually comprises:

(1) the step of removing stain of the metal surface, thereby improving the wettability and adhesion of the coating composition, for example, publicly known steps of alkaline degreasing, acid pickling, sand blasting, washing, hot water rinsing and polishing, (2) the step of pre-treatment for improving the wettability and adhesion of the coating composition, for example, the step of a publicly known treatment such as chromate treatment, treatment with zinc phosphate, treatment with iron phosphate, phosphating treatment, double oxide coating treatment or displacement deposition treatment of Ni or Co, or the step of treatments used in combination, (3) the step of applying or adhering the coating composition onto the surface of the metal material, (4) the drying step of vaporizing the solvent in the coating composition on the surface of the metal material, (5) the heating step for accelerating the curing reaction in the coating composition, (6) the step of irradiating with radiation for accelerating the curing reaction in the coating composition, and (7) the step of preheating the metal material previously to accelerate aforementioned step (4) and/or aforementioned step (5).

In the method for manufacturing a coated metal material of the present invention, a radiation curable coating film can be formed on the surface of the metal material by using the steps (3), (4) and (6) as an indispensable step in combination with other steps.

The sequence of these steps is not specifically limited and may be selected and decided according to the purposes and kinds of the treating chemical. Since the curing reaction of the radiation curable aqueous coating composition of the present invention proceeds by radiation, aforementioned step (6) is required.

The coating composition can be designed so that the curing reaction proceeds by irradiation with ultraviolet light, which requires comparatively cheap equipment cost and running cost, among these radiations.

The step (3) of applying can be conducted, for example, by a publicly known method such as roll coating, curtain coating, dip coating, spray coating, brush coating, electrodeposition coating or the like.

The step (4) of vaporizing the solvent can be conducted by a publicly known method such as air drying, hot-air heating, induction heating, irradiation with infrared ray and far infrared ray, ultrasonic vibration or the like.

The step (5) can be conducted, for example, by the method of heating the metal material used in the step (4).

The step (6) is a step of irradiating with radiation, and regarding the coating film of the radiation curable aqueous coating composition, the resin in the coating film is cured by crosslinking due to irradiation with radiation such as ultraviolet light, visible light, electron beam, X-ray or the like.

The radiation is preferably ultraviolet light or electron beam.

In the case in which the coating film is cured by irradiation with electron beam, polymerization initiators are not required. The coating film can be obtained by irradiating with electron beam of a total dose of 5 to 200 kGy, preferably 10 to 100 kGy, in an atmosphere of a gas containing a small amount of oxygen or an inert gas atmosphere, using an electron irradiating apparatus of an acceleration voltage of 20 to 2000 KeV, preferably 150 to 300 KeV.

In the case in which the coating film is irradiated with ultraviolet light, it is cured in an air or an inert gas atmosphere using a mercury lamp or xenon lamp as a light source.

In this case, photopolymerization initiators are added. The photopolymerization initiator can be arbitrarily selected from publicly known substances. The amount can also be arbitrarily selected and is, for example, within a range from about 0.2 to 20% by weight, and preferably from 0.5 to 10% by weight, based on the nonvolatile content of the coating composition.

The step (7) can be conducted by the method of heating the metal material described in the steps (4) and (5). Specific conditions of the respective processes may be appropriately selected.

In the case in which a coating film is formed on the surface of the metal material using the radiation curable aqueous coating composition of the present invention, the coating weight may be decided according to the purposes. For the purposes of prevention of fingerprints and lubricating steel sheet, the coating composition is applied so that the cured coating film has a thickness within a range from about 1 to 3 μm.

EXAMPLES

The present invention will now be described specifically by way of the following Examples. First, Synthesis Examples of the aqueous polyurethane resin (II) used in the present invention and aqueous polyurethane resin (II) using hydrogenated MDI are described and specifically explained by Synthesis Examples 1 and 2.

In the following Examples, parts and percentages are by weight unless otherwise specified. In the following descriptions, the viscosity denotes a Gardner viscosity.

Synthesis Example 1

In a reaction vessel equipped with a reflux condenser, a nitrogen introducing tube and a thermometer, 2.4 parts of polyoxyethylene glycol (Mn=600), 19.6 parts of 2,2-bis(hydroxymethyl)propionic acid, 34.4 parts of polyester diol(neopentyl glycol adipate: Mn=500), 4.4 parts of trimethylolpropane, 9.7 parts of butylethylpropanediol, 83.8 parts of Takenate 600 (manufactured by Takeda Chemical Industries, Ltd.: hydrogenated XDI), 154.3 parts of methyl ethyl ketone and 0.008 parts of dibutyltin laurate were charged with stirring and heated to 70° C. over 0.5 hours, and then the reaction was conducted at 70 to 75° C. for 3 hours.

Then, 0.05 parts of tert-butylhydroquinone, 44.3 parts of LIGHT-ESTER G-201P (manufactured by KYOEISHA CHEMICAL CO., LTD.) and 88.5 parts of MEK (methyl ethyl ketone) were added, and after replacing a nitrogen introducing tube by an air introducing tube, the reaction was conducted again at 70 to 75° C. for 10 hours while adding 0.04 part of tert-butylhydroquinone every 4 hours to obtain a solution of a polyurethane resin.

14.7 parts of triethylamine and 516.1 parts of pure water were gradually added to the resulting solution. After allowing to stand at 30° C. for 2 hours, 0.5 parts of Surfinol AK02 (manufactured by Nisshin Chemical Industries Co., Ltd.) was added and methyl ethyl ketone was distilled off under reduced pressure at 50° C. to obtain, as a transparent liquid, an aqueous solution of a radiation curable aqueous polyurethane resin (II) having a nonvolatile content of 29.3%, a solid content of an acid value of 40.5 KOH mg/g, a Gardner viscosity of U-V, and an unsaturated group concentration of 1.9 eq./kg.

Synthesis Example 2

In a reaction vessel equipped with a reflux condenser, a nitrogen introducing tube and a thermometer, 3.2 parts of polyoxyethylene glycol (Mn=600), 42.6 parts of lactone polyester diol OD-X-2155 (Mn=970, manufactured by DAINIPPON INK & CHEMICALS, INC.), 21.14 parts of 2,2-bis(dihydroxymethyl)butanoic acid, 7.1 parts of butylethylpropanediol, 22.9 parts of castor oil LM-R (manufactured by HOKOKU CORPORATION), 47.4 parts of hydrogenated MDI, 170.9 parts of methyl ethyl ketone and 0.02 parts of stannous octoate were charged with stirring and heated to 70° C. over 0.5 hours, and then the reaction was conducted at 70 to 75° C. for 3 hours.

Then, 28.8 parts of hydrogenated XDI (Takenate 600) was added and the reaction was conducted again at 70 to 75° C. for one hour.

Then, 0.2 parts of methoquinone, 40.3 parts of LIGHT-ESTER G-201P (manufactured by KYOEISHA CHEMICAL CO., LTD.) and 0.1 parts of stannous octoate were added, and after replacing a nitrogen introducing tube by an air introducing tube, the reaction was continued again at 70 to 75° C.

The reaction was conducted for 10 hours while adding 0.04 part of tert-butyl-hydroquinone and 0.04 parts of stannous octoate every 4 hours to obtain a solution of a polyurethane resin.

After cooling to 30° C., 14.4 parts of triethylamine and 530 parts of pure water were added to the resulting solution. After adding 0.5 parts of Surfinol AK02 (manufactured by Nisshin Chemical Industries Co., Ltd.), methyl ethyl ketone was distilled off under reduced pressure at 50° C. to obtain, as a transparent liquid, an aqueous solution of a radiation curable aqueous polyurethane resin (II) having a nonvolatile content of 30.0%, a solid content of an acid value of 39.3 KOH mg/g, a Gardner viscosity of U, and an unsaturated group concentration of 1.6 eq./kg, using hydrogenated MDI.

Synthesis Example 3

In a reaction vessel equipped with a reflux condenser, a nitrogen introducing tube and a thermometer, 1.5 parts of polyoxyethylene glycol (Mn=600), 42.4 parts of polytetramethylene glycol PTMG1000 (Mn=1000, manufactured by MITSUBISHI CHEMICAL CORPORATION), 18.6 parts of 2,2-bis(dihydroxymethyl)butanoic acid, 20.6 parts of castor oil LM-R (manufactured by HOKOKU CORPORATION), 70.9 parts of hydrogenated MDI, 153.9 parts of methyl ethyl ketone and 0.03 parts of stannous octoate were charged with stirring and heated to 70° C. over 0.5 hours, and then the reaction was conducted at 70 to 75° C. for 3 hours.

Then, 0.2 parts of methoquinone, 29.3 parts of LIGHT-ESTER G-201P (manufactured by KYOEISHA CHEMICAL CO., LTD.) and 0.1 parts of stannous octoate were added, and after replacing a nitrogen introducing tube by an air introducing tube, the reaction was continued again at 70 to 75° C.

The reaction was conducted for 10 hours while adding 0.04 part of tert-butyl-hydroquinone and 0.04 parts of stannous octoate every 4 hours to obtain a solution of a polyurethane resin.

After cooling to 30° C., 12.7 parts of triethylamine and 477.0 parts of pure water were added to the resulting solution. After adding 0.5 parts of Surfinol AK02 (manufactured by Nisshin Chemical Industries Co., Ltd.), methyl ethyl ketone was distilled off under reduced pressure at 50° C. to obtain, as a transparent liquid, an aqueous solution of a radiation curable aqueous polyurethane aqueous polyurethane resin (II) having a nonvolatile content of 30.0%, a solid content of an acid value of 44.2 KOH mg/g, a Gardner viscosity of V-W, and an unsaturated group concentration of 1.5 eq./kg, using polytetramethylene glycol and hydrogenated MDI.

Next, the evaluation results of coated metal materials (Examples) which are obtained by applying radiation curable aqueous coating compositions of the present invention, prepared by using aqueous polyurethane resin (II) obtained in Synthesis Examples 1 to 3 to a metal material and curing, will be explained together with Comparative Examples.

Examples 1 to 4

Comparative Examples 1 to 3

In accordance with Table 1, radiation curable aqueous coating composition containing a phosphoric acid ester compound (I), an aqueous polyurethane resin (II) and colloidal silica were prepared (Examples 1 to 4). As Comparative Examples, radiation curable aqueous coating compositions, which do not contain a phosphoric acid ester compound (I) or colloidal silica, were prepared (Comparative Examples 2 and 3).

As Comparative Example of an aqueous polyurethane resin which has not an ethylenically unsaturated group and a salt group in a molecule and also has good workability, an aqueous urethane resin "SPENSOL: L-512", manufactured by DAINIPPON INK & CHEMICALS, INC.) used in a coating composition for prevention of leaving fingerprints was used. This resin has a nonvolatile content of 30%. In Table 1, this is described as an "aqueous polyurethane" (Comparative Example 1).

The respective components other than the aqueous resin are as described in Table 1. Units of all numerical values other than percentages are parts by weight.

Kayamer PM21: phosphoric acid ester, manufactured by NIPPON KAYAKU CO., LTD.

Irgacure 184: 1-hydroxycyclohexyl phenyl ketone as photopolymerization initiator, manufactured by Ciba Specialty Chemicals NUC-Silicon A-174: γ-methacryloxypropyltrimethoxysilane as silane coupling agent, manufactured by Nippon Unicar Co., Ltd.

Snowtex-C: colloidal silica treated with aluminum, manufactured by Nissan Chemical Industries Ltd.

Aquacer 537: water dispersion olefin wax, manufactured by Big Chemie, Japan

FZ-3153: silicone emulsion manufactured by Nippon Unicar Co., Ltd.

TABLE 1

|  | Solid content % | Example 1 | Example 2 | Example 3 | Example 4 | Comparative Example 1 | Comparative Example 2 | Comparative Example 3 |
|---|---|---|---|---|---|---|---|---|
| Aqueous polyurethane resin (II) | 29.3% |  | 102.4 |  |  |  |  |  |
| Aqueous polyurethane resin (II) using hydrogenated MDI | 30.0% | 100.0 |  | 100.0 |  |  | 100.0 | 100.0 |
| Aqueous polyurethane resin (II) using PTMG and hydrogenerated MDI | 30.0% |  |  |  | 100.0 |  |  |  |
| Aqueous polyurethane | 30.0% |  |  |  |  | 100.0 |  |  |
| Kayamer PM21 | 100.0% | 3.0 | 3.0 | 3.0 | 3.0 |  | 3.0 |  |
| Triethylamine |  | 1.0 | 1.0 | 1.0 | 1.0 | 0.0 | 1.0 |  |
| Irgacure 184 |  | 1.2 | 1.2 | 0.0 | 1.2 | 0.0 | 1.2 | 1.2 |
| Snowtex C | 20.0% | 15.0 | 15.0 | 15.0 | 15.0 | 0.0 |  | 15.0 |
| Isopropanol |  | 3.6 | 3.6 |  |  | 0.0 | 3.6 | 3.6 |
| NUC-Silicon A-174 | 100.0% | 0.6 | 0.6 | 0.6 | 0.6 | 0.6 | 0.6 | 0.6 |
| Aquacer537 | 30.0% | 2.0 | 2.0 | 2.0 | 2.0 | 2.0 | 2.0 | 2.0 |
| FZ-3153 | 20.0% | 3.0 | 3.0 | 3.0 | 3.0 | 3.0 | 3.0 | 3.0 |
| Pure water |  | 59.6 | 57.2 | 64.4 | 63.2 | 53.4 | 59.6 | 48.6 |
| Total |  | 189.0 | 189.0 | 189.0 | 189.0 | 159.0 | 174.0 | 174.0 |

Manufacture of Coated Metal Material

Using the coating composition and aqueous urethane resin thus prepared, a coating film was formed on the surface of a metal material by the method described below.

As the metal material to be coated, a 0.8 mm thick electrogalvanized steel sheet with no pre-coating treating layer (hereinafter referred to as a non-treated electrogalvanized steel sheet), a 0.8 mm thick galvanized steel sheet with no undercoat layer (hereinafter referred to as a non-treated galvanized steel sheet) and a 0.8 mm thick chromated (coating weight: about 10 mg/m$^2$ reduced to metal chromium basis) electrogalvanized steel sheet were used. With respect to the non-treated galvanized steel sheet, a rust preventive oil film of the sheet was removed with methyl ethyl ketone before use.

In Examples 1, 2 and 4 and Comparative Examples 2 and 3, a coated metal material was manufactured in the following manner. Using a drawdown rod #3, a radiation curable aqueous coating composition having a nonvolatile content of 20% was applied on each of the metal materials so that a cured coating film has a thickness of about 1 μm, followed by drying at 80° C. for 2 minutes by an air dryer. Using a 120 W high-pressure mercury lamp, a coating film was cured by irradiation with ultraviolet light of a dose of 130 mJ/cm$^2$ (conveyor speed: 10 m).

In Comparative Example 1, using a drawdown rod #3, an aqueous coating composition having a nonvolatile content of 20% was applied so that a cured coating film has a thickness of about 1 μm, followed by drying at 200° C. for 2 minutes by an air dryer.

In Example 3, after applying and drying in the same manner as in Examples 1 and 2 and Comparative Examples 2 and 3, a coating film was cured by irradiation with electron beam of a dose of 30 kGy (grey) at an acceleration voltage of 165 kV using an electric curtain manufactured by Iwasaki Electric.

"Non-treated electrogalvanized steel sheets", "non-treated galvanized steel sheets" and "chromated electrogalvanized steel sheets" described in Table 2 and Table 3 denote 0.8 mm thick non-treated electrogalvanized steel sheets, 0.8 mm thick non-treated galvanized steel sheets and 0.8 mm chromated electrogalvanized steel sheets, respectively.

In the solvent resistance test, coated metal materials made of the non-treated electrogalvanized steel sheet and the chromated electrogalvanized steel sheet were used. In the adhesion test and the workability test, coated metal materials made of the non-treated galvanized steel sheet, the non-treated electrogalvanized steel sheet and the chromated electrogalvanized steel sheet were used.

Ethanol as an extra pure reagent was used in the ethanol resistance test, while methyl ethyl ketone as an extra pure reagent was used in the MEK resistance test.

The solvent resistance test (mechanical rubbing test), the adhesion test (grid peeling test using cellophane adhesive tape), the workability test I (grid Erichsen workability test), the workability test II (folding test using vice), the workability test III (deep drawing test), the degreasing solution resistance test, and the corrosion resistance test of the cured coating film were conducted in the following procedures. The results are shown in Table 2 and Table 3.

Solvent Resistance Test (Mechanical Rubbing Test)

Test pieces of a coated metal material in size of 5×13 cm was made and 0.8 g of an absorbent cotton was mounted to a head of a rubbing tester, Type I (manufactured by TAIHEI RIKA KOGYO Co., Ltd.) while being surrounded with a gauze in size of 4.5×3.5 cm, and after impregnating the absorbent cotton with a solvent, each test piece was rubbed predetermined times (10, 20, 50 and 60 times) under a load of 300 g. Then, it was judged whether or not the substrate is exposed in accordance with the following criteria.

⊚: Any exposed portion is not observed, and less rubbing mark is observed

○: Any exposed portion is not observed, but some rubbing mark is observed.

Δ: Small trace of substrate is exposed.

X: The coating is exposed as a result of peeling off.

Adhesion Test (Grid Peeling Test Using Cellophane Adhesive Tape)

A grid (100 squares per cm$^2$) of 11 by 11 lines, each at a distance of 1 mm, was scratched in the coating film of each test piece of a coated metal material at the center portion, using a cutter knife. Then, a cellophane adhesive tape was applied on the grid and peeled off rapidly. The area of the coating film remaining on the grid was determined and indicated by percentage.

Workability Test I (Boiling-Grid Erichsen Workability Test)

In the same manner as in the method of forming a grid, a grid was formed on the center portion that is 3 cm away from the end of each test piece of a coated metal material in size of 5×13 cm boiled previously for 3 hours, and then the center portion of the grid was extruded by 5 cm using an Erichsen testing machine. In the same manner as described above, the grid portion was peeled off using a cellophane adhesive tape and then the area of the coating film remaining on the grid was determined and indicated by percentage.

Workability Test II (Folding Test Using Vice)

Using a test piece of a coated metal material in size of 5×15 cm, it was bent by 180° while facing the coated surface outward. A T setting sheet having the same thickness of the test piece was prepared and bent while gripping with a vice. The case where the number of sheets to be inserted is 0, 1, 2 or 3, the symbol "0T", "1T", "2T" or "3T" is described in the table, respectively. The bent portion was subjected to the cellophane adhesive tape peeling test and the maximum number of T setting sheets where no peeling occurs was taken as an index of the workability.

Workability Test III (Deep Drawing Test)

After cupping was carried out at a draw ratio of 2.0 without applying lubricating oil, a grid (25 squares per $cm^2$) of 6 by 6 lines, each at a distance of 2 mm, was scratched in the coating film of each test piece at the trunk portion, using a cutter knife. Then, a cellophane adhesive tape was applied on the grid and peeled off rapidly. The area of the coating film remaining on the grid was determined and indicated by percentage.

Degreasing Solution Resistance Test

After heating a degreasing solution prepared by dissolving 18 g of a degreasing agent FC-4480 (manufactured by Nihon Parkerizing Co., Ltd.) in 1 L of deionized water to 45° C., each test piece in size of 5×13 cm of a coated metal material was immersed in the degreasing solution for 3 minutes. After each test piece was washed with water and dried, the state of the coating film was visually observed.

◯: No change is observed in the state of the coating film before and after test.

Δ: Peel of the coating film is observed.

X: Coating film is partially dissolved.

Corrosion Resistance Test

In accordance with the procedure of a salt spray test defined in JIS Z 2371, an aqueous 5% NaCl solution was sprayed over each test piece in size of 5×15 cm of a coated metal material at an atmospheric temperature of 35° C. and the evaluation was performed using a percentage of the areas in which white rust occurred after 72 hours in accordance with the following criteria.

◎: Percentage of the areas in which white rust occurred is less than 10%

◯: Percentage of the areas in which white rust occurred is within a range from 10 to 20%

Δ: Percentage of the areas in which white rust occurred is within a range from 20 to 30%

X: Percentage of the areas in which white rust occurred is 30% or more

TABLE 2

|  | Rolled material | Example 1 | Example 2 | Example 3 | Example 4 | Comparative Example 1 | Comparative Example 2 | Comparative Example 3 |
|---|---|---|---|---|---|---|---|---|
| Ethanol resistance, 5 times | Non-treated electrogalvanized steel sheet | ◎ | ◎ | ◎ | ◎ | X | ◎ | ◯ |
| Ethanol resistance, 10 times | Non-treated electrogalvanized steel sheet | ◎ | ◎ | ◎ | ◎ | X | ◎ | X |
| Ethanol resistance, 20 times | Non-treated electrogalvanized steel sheet | ◎ | ◎ | ◎ | ◎ | X | ◎ | X |
| Ethanol resistance, 50 times | Non-treated electrogalvanized steel sheet | ◯ | ◯ | ◯ | ◎ | X | ◯ | X |
| Ethanol resistance, 60 times | Non-treated electrogalvanized steel sheet | ◯ | Δ | ◯ | ◯ | X | X | X |
| MEK resistance, 10 times | Non-treated electrogalvanized steel sheet | ◎ | ◎ | ◎ | ◎ | X | ◎ | ◯ |
| MEK resistance, 20 times | Non-treated electrogalvanized steel sheet | ◎ | ◎ | ◎ | ◎ | X | ◎ | X |
| MEK resistance, 50 times | Non-treated electrogalvanized steel sheet | ◯ | ◯ | ◯ | ◎ | X | ◯ | X |
| MEK resistance, 60 times | Non-treated electrogalvanized steel sheet | ◯ | Δ | ◯ | ◯ | X | X | X |
| Adhesion | Non-treated galvanized steel sheet | 100 | 100 | 100 | 100 | 100 | 100 | 100 |
| Adhesion | Non-treated electrogalvanized steel sheet | 100 | 100 | 100 | 100 | 100 | 100 | 100 |
| Workability test I | Non-treated galvanized steel sheet | 100 | 100 | 100 | 100 | 32 | 100 | 100 |

TABLE 2-continued

|  | Rolled material | Example 1 | Example 2 | Example 3 | Example 4 | Comparative Example 1 | Comparative Example 2 | Comparative Example 3 |
|---|---|---|---|---|---|---|---|---|
| Workability test I | Non-treated electrogalvanized steel sheet | 100 | 100 | 100 | 100 | 35 | 100 | 100 |
| Workability test II | Non-treated galvanized steel sheet | 0T | 0T | 0T | 0T | 0T | 0T | 1T |
| Workability test II | Non-treated electrogalvanized steel sheet | 0T | 0T | 0T | 0T | 0T | 0T | 0T |
| Workability test III | Non-treated galvanized steel sheet | 25/25 | 25/25 | 25/25 | 25/25 | 2/25 | 25/25 | 5/25 |
| Workability test III | Non-treated electrogalvanized steel sheet | 25/25 | 25/25 | 25/25 | 25/25 | 2/25 | 25/25 | 5/25 |
| Degreasing solution resistance | Non-treated galvanized steel sheet | Δ | Δ | Δ | ○ | ○ | Δ | Δ |
| Degreasing solution resistance | Non-treated electrogalvanized steel sheet | Δ | Δ | Δ | ○ | ○ | Δ | Δ |
| Corrosion resistance | Non-treated galvanized steel sheet | ○ | ○ | ○ | ○ | ○ | Δ | ○ |
| Corrosion resistance | Non-treated electrogalvanized steel sheet | ○ | ○ | ○ | ○ | ○ | Δ | ○ |

TABLE 3

|  | Rolled material | Example 1 | Example 2 | Example 3 | Example 4 | Comparative Example 1 | Comparative Example 2 | Comparative Example 3 |
|---|---|---|---|---|---|---|---|---|
| Ethanol resistance, 5 times | Chromated electrogalvanized steel sheet | ◎ | ○ | ◎ | ◎ | X | ○ | Δ |
| Ethanol resistance, 10 times | Chromated electrogalvanized steel sheet | ○ | ○ | ○ | ○ | X | ○ | X |
| Ethanol resistance, 20 times | Chromated electrogalvanized steel sheet | ○ | ○ | ○ | ○ | X | ○ | X |
| Ethanol resistance, 50 times | Chromated electrogalvanized steel sheet | Δ | Δ | Δ | Δ | X | X | X |
| Ethanol resistance, 60 times | Chromated electrogalvanized steel sheet | X | X | X | X | X | X | X |
| MEK resistance, 10 times | Chromated electrogalvanized steel sheet | ◎ | ○ | ◎ | ◎ | X | ○ | ○ |
| MEK resistance, 20 times | Chromated electrogalvanized steel sheet | ○ | ○ | ○ | ○ | X | ○ | X |
| MEK resistance, 50 times | Chromated electrogalvanized steel sheet | ○ | Δ | ○ | ○ | X | Δ | X |
| MEK resistance, 60 times | Chromated electrogalvanized steel sheet | Δ | X | Δ | Δ | X | X | X |
| Adhesion | Chromated electrogalvanized steel sheet | 100 | 100 | 100 | 100 | 100 | 100 | 73 |
| Workability test I | Chromated electrogalvanized steel sheet | 100 | 100 | 100 | 100 | 22 | 100 | 70 |
| Workability test II | Chromated electrogalvanized steel sheet | 0T | 0T | 0T | 0T | 0T | 0T | 1T |
| Workability test III | Chromated electrogalvanized steel sheet | 25/25 | 25/25 | 25/25 | 25/25 | 10/25 | 25/25 | 5/25 |

TABLE 3-continued

| | Rolled material | Example 1 | Example 2 | Example 3 | Example 4 | Comparative Example 1 | Comparative Example 2 | Comparative Example 3 |
|---|---|---|---|---|---|---|---|---|
| Degreasing solution resistance | Chromated electrogalvanized steel sheet | Δ | Δ | Δ | ○ | ○ | Δ | Δ |
| Corrosion resistance | Chromated electrogalvanized steel sheet | ○ | ○ | ○ | ○ | ○ | ○ | ○ |

As is apparent from Table 2 and Table 3, since all test pieces of Comparative Examples were rated "X" in the ethanol resistance test (60 times rubbing) and the MEK resistance test (60 times rubbing) that are most severe solvent resistance tests among these tests, while the test pieces of Examples 1, 3 and 4 were rated "○" and the test piece of Example 2 was rated "Δ", the coating films using the aqueous coating composition of the present invention are superior in solvent resistance.

As is apparent from excellent ratings in any of the coating film adhesion test, the workability test I, the workability test II, the workability test III and the corrosion resistance, the respective Examples are not only superior in solvent resistance, but also superior in adhesion, coating film adhesion after severe working, chemical solution resistance and corrosion resistance.

As is apparent from the results of the resistance test, the adhesion test and the workability test, the metal material having no chromated coating film exerts the effect equal to or higher than that in the case of being subjected to a chromate treatment in the effect of the adhesion to the metal material and the solvent resistance of the coating film.

INDUSTRIAL APPLICABILITY

The radiation curable aqueous coating composition of the present invention is an aqueous coating composition which is highly safe and is capable of improving working environment, and which has excellent ethanol resistance and excellent MEK resistance, which could not be attained by the prior art, and excellent adhesion to various articles to be coated, and also which is suitable for use in coating compositions, coating agents, inks, primer coatings, and anchoring agents. The coated metal material of the present invention is a coated metal material comprising a metal material and a coating film formed on the surface of the metal material, the coating film being formed by curing the radiation curable aqueous coating, and has high solvent resistance and excellent adhesion, particularly adhesion after working to the surface of the metal, and is suitable for use in various working purposes such as severe deep drawing.

The invention claimed is:
1. A radiation curable aqueous coating composition comprising:
   (1) a phosphoric acid ester compound having an ethylenically unsaturated double bond,
   (2) an aqueous polyurethane resin having both an ethylenically unsaturated double bond and a group capable of forming a salt, and
   (3) aluminum treated colloidal silica ranging from 5 to 25% by weight based on the nonvolatile content of the radiation curable aqueous coating composition, and
   (4) a water-containing solvent.
2. The radiation curable aqueous coating composition according to claim 1, wherein the phosphoric acid ester compound having an ethylenically unsaturated double bond comprises phosphoric acid esters having a (meth)acryloyloxy group represented by the General Formula (1):

General Formula (1)

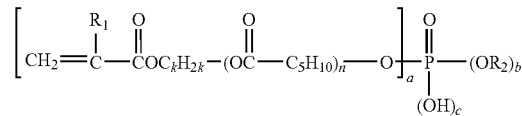

(wherein R, represents a hydrogen atom or a methyl group, $R_2$ represents an alkyl group having 1 to 8 carbon atoms, k represents an integer of 2 to 12, n represents an integer of 0 to 3, a+b+c=3, a represents an integer of 1 to 3, and b represents an integer of 0 to 2).

3. The radiation curable aqueous coating composition according to claim 1, wherein a portion or all of a polyisocyanate component of the aqueous polyurethane resin is dicyclohexylmethane-4,4'-diisocyanate.

4. The radiation curable aqueous coating composition according to claim 1, wherein a portion of a polyol component of the aqueous polyurethane resin is polytetramethylene glycol.

5. The radiation curable aqueous coating composition according to claim 1, wherein the colloidal silica is surface-treated with aluminum.

6. A coated metal material comprising a metal material and a coating film formed on the surface of the metal material, the coating film being formed by curing the radiation curable aqueous coating composition of any one of claims 1 to 5 with radiation.

7. The coated metal material according to claim 6, wherein the metal material is a metal material with a coating agent on the surface thereof.

8. The coated metal material according to claim 7, wherein the coating agent is zinc, an alloy of zinc and another metal, or a zinc compound.

9. The coated metal material according to claim 8, wherein the metal material is a non-chromated steel sheet.

10. A method for manufacturing a coated metal material, comprising the steps of applying the radiation curable aqueous coating composition of any one of claims 1 to 5 on the surface of a metal material, vaporizing a solvent component in the coating composition to form a coating film, and irradiating the coating film with radiation.

11. A radiation curable aqueous coating composition comprising:
   (1) a phosphoric acid ester compound having an ethylenically unsaturated double bond,
   (2) an aqueous polyurethane resin having both an ethylenically unsaturated double bond and a group capable of forming a salt, and (3) colloidal silica which has been surface-treated with aluminum.

12. A radiation curable aqueous coating composition comprising:
(1) a phosphoric acid ester compound having an ethylenically unsaturated double bond,
(2) an aqueous polyurethane resin having both an ethylenically unsaturated double bond and a group capable of forming a salt,
(3) colloidal silica, and
(4) a silane coupling agent.

13. A radiation curable aqueous coating composition comprising:
(1) a phosphoric acid ester compound having an ethylenically unsaturated double bond,
(2) an aqueous polyurethane resin derived from monohydroxy di(meth)acrylate and having both an ethylenically unsaturated double bond and a group capable of forming a salt, and
(3) colloidal silica.

* * * * *